(12) United States Patent
Shui et al.

(10) Patent No.: US 12,067,067 B2
(45) Date of Patent: Aug. 20, 2024

(54) SITE RECOMMENDATION METHOD, ELECTRONIC DEVICE, AND STORAGE MEDIUM

(71) Applicant: Beijing Baidu Netcom Science Technology Co., Ltd., Beijing (CN)

(72) Inventors: JuanJuan Shui, Beijing (CN); Yingjie Niu, Beijing (CN); Qiushen Qu, Beijing (CN); Weipeng Niu, Beijing (CN); Jiankang Xin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/850,930

(22) Filed: Jun. 27, 2022

(65) Prior Publication Data

US 2022/0405339 A1 Dec. 22, 2022

(30) Foreign Application Priority Data

Sep. 30, 2021 (CN) .......................... 202111161591.7

(51) Int. Cl.
*G06F 16/9537* (2019.01)
*G06F 16/9535* (2019.01)
*G06F 16/9538* (2019.01)

(52) U.S. Cl.
CPC ...... *G06F 16/9537* (2019.01); *G06F 16/9535* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 11,797,931 B1* | 10/2023 | Gross | G01C 21/3415 |
| 2013/0103697 A1 | 4/2013 | Hill et al. | |
| 2021/0073728 A1* | 3/2021 | Yu | G06Q 10/0836 |

FOREIGN PATENT DOCUMENTS

| | | |
|---|---|---|
| CN | 101936960 B | 11/2012 |
| CN | 104598602 A | 5/2015 |
| CN | 106599092 A | 4/2017 |
| CN | 107025254 A | 8/2017 |
| CN | 107181862 A | 9/2017 |
| CN | 109471984 A | 3/2019 |
| CN | 111143676 A | 5/2020 |

(Continued)

OTHER PUBLICATIONS

Lan et al., "A Review About International Tourism Destination Revist Decision—Making Behavior"; Journal of Nanjing Normal University (Natural Science Edition), Dec. 2011; vol. 34(4):135-141.

(Continued)

*Primary Examiner* — Amresh Singh
(74) *Attorney, Agent, or Firm* — Polsinelli PC; Derek D. Donahoe (57) ABSTRACT

A site recommendation method, an electronic device, and a readable storage medium are provided, which relate to the field of automatic driving. The method includes: determining, in response to a query request of a user terminal for a target position, a target site recommended to a target user within a specified range of the target position, wherein the target site includes a site that the target user is interested in under a specified travel condition; and sending the target site to the user terminal.

15 Claims, 4 Drawing Sheets

(56) References Cited

FOREIGN PATENT DOCUMENTS

| | | |
|---|---|---|
| CN | 111414557 A | 7/2020 |
| CN | 112182430 A | 1/2021 |
| CN | 112612957 A | 4/2021 |
| CN | 113158083 A | 7/2021 |
| WO | 2016/166309 A1 | 10/2016 |

OTHER PUBLICATIONS

Extended European Search Report for corresponding EP Application No. 22180359.6 issued Jan. 5, 2023 (7 pages).
Office Action/Search Report for corresponding CN Application No. 2021111615917 issued Jul. 26, 2022.

\* cited by examiner

SITE RECOMMENDATION METHOD, ELECTRONIC DEVICE, AND STORAGE MEDIUM

CROSS-REFERENCE TO RELATED APPLICATION

This application claims priority to Chinese patent application No. 202111161591.7, filed on Sep. 30, 2021, which is hereby incorporated by reference in its entirety.

TECHNICAL FIELD

The present disclosure relates to the field of artificial intelligence, particularly to intelligent search and intelligent transportation technologies, which may be specifically applied to scenarios of intelligent search and smart city.

BACKGROUND

Based on the target position selected by a user, the recommending of sites such as points of interest for the user has become an important way to recommend information for the user. For example, both of the "surrounding" and "nearby" services provided by an electronic map application are recommending sites for the user based on the position selected by the user.

SUMMARY

The present disclosure provides a site recommendation method and apparatus, an electronic device, a readable storage medium, and a computer program product, so as to be targeted to recommend to a site meeting the needs of a user to the user.

According to an aspect of the present disclosure, there is provided a site recommendation method, which can include:
  determining, in response to a query request of a user terminal for a target position, a target site recommended to a target user within a specified range of the target position, wherein the target site includes a site that the target user is interested in under a specified travel condition; and
  sending the target site to the user terminal.

According to another aspect of the present disclosure, there is provided an electronic device, including:
  at least one processor; and
  a memory in communications connection with the at least one processor, wherein
  the memory stores instructions executable by the at least one processor, and the instructions, when executed by the at least one processor, enable the at least one processor to perform the method of any one of embodiments of the present disclosure.

According to another aspect of the present disclosure, there is provided a non-transitory computer-readable storage medium storing computer instructions, wherein the computer instructions, when executed by a computer, cause the computer to perform the method of any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the solution and do not constitute a limitation to the present disclosure. In which:
FIGS. 4 (a) and (b) is a schematic diagram of a recommendation result display according to an embodiment of the present disclosure.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
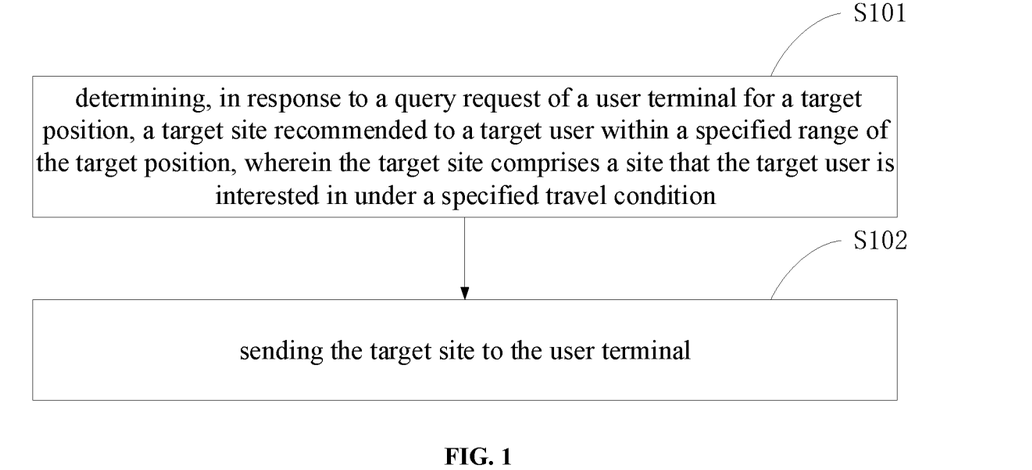
FIG. 1 is a flowchart of a site recommendation method according to an embodiment of the present disclosure.

The present disclosure provides a site recommendation method. For details, please refer to FIG. 1, and FIG. 1 is a flowchart of a site recommendation method according to an embodiment of the present disclosure. The method can include:
  S101: determining, in response to a query request of a user terminal for a target position, a target site recommended to a target user within a specified range of the target position, wherein the target site includes a site that the target user is interested in under a specified travel condition.
  S102: sending the target site to the user terminal.

According to the technology of the present disclosure, the target site recommended to the target user is a site that the target user is interested in under the specified travel condition. Therefore, the target site is not only a site that the target user is interested in, but also can satisfy the specified travel condition of the target user. Thus, the target site has a stronger pertinence to the target user and can better meet the needs of the user.

In the existing solutions for recommending sites for a user based on the target position selected by the user, a site of a same type as the type of the target position is often used as a recommended site for the user, or a commercial place around the target position is used as the recommended site for a user recommended to the target user. The foregoing recommendation method does not consider the needs of the target user. This will result in not only poor diversity of recommended sites, but also poor pertinence of the recommended sites.

In the site recommendation method provided in the embodiments of the present disclosure, the target site recommended to the target user is a site that the target user is interested in under the specified travel condition. Therefore, the target site is not only a site that the target user is interested in, but also can satisfy the specified travel condition of the target user. Thus, the target site has a stronger pertinence to the target user and can better meet the needs of the user.

For the site recommendation method provided in the embodiments of the present disclosure, the execution subject is generally a server. The server is a server or server cluster that provides data storage, data processing and other services to a client running a target program, an application, or software.

The client is an electronic device running a target program, application or software. The electronic device includes but is not limited to mobile phones and computers. The target program, application or software usually includes a program, application, or software with a site recommendation function.

The target position refers to the position where the target user searches or clicks on the user terminal, or the current position of the target position automatically positioned by the user terminal based on a positioning system. For example, the Exit A of the XX subway station in Beijing.

The query request refers to a request for querying the target site triggered by the user based on the human-computer interaction through the user terminal.

The designated range may be a predetermined range, for example, 1 km, 5 km, or the like, and also may be a further set range based on a specified travel condition.

The target site includes but is not limited to a point of interest (POI) and a place. For example, attractions, stations, restaurants, public places, and entertainment venues.

Figure 2:
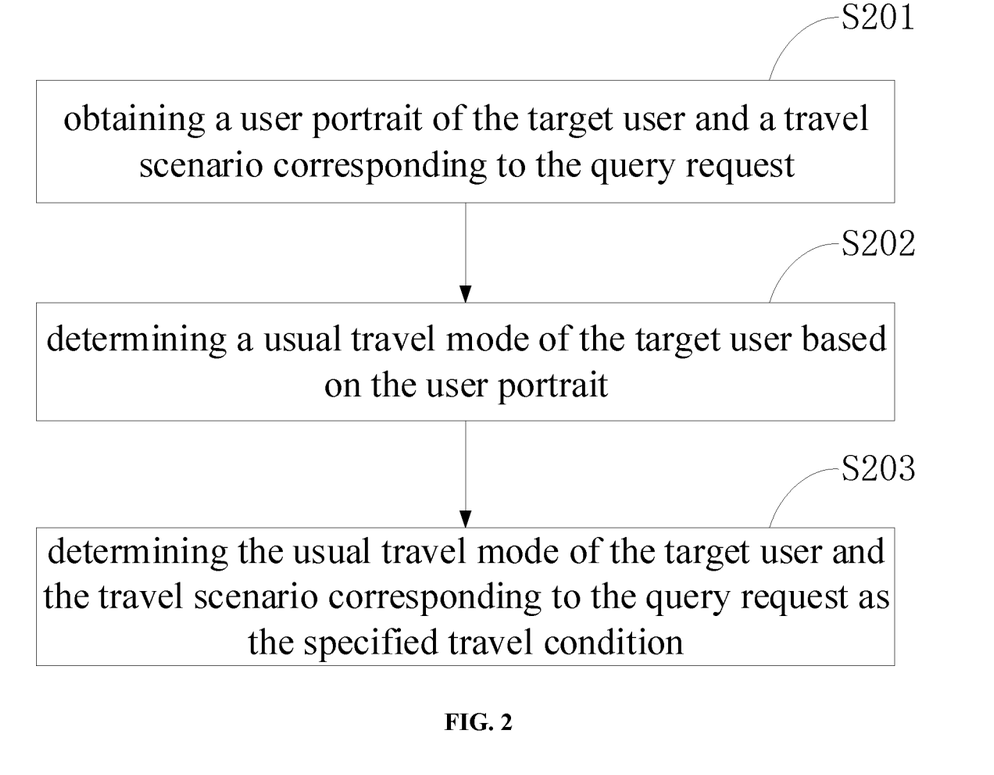
FIG. 2 is a flowchart of a travel condition determining method according to an embodiment of the present disclosure.

In the embodiments of the present disclosure, please refer to FIG. 2 for the determining the specified travel condition. FIG. 2 is a flowchart of a travel condition determining method according to an embodiment of the present disclosure.

S201: obtaining a user portrait of the target user and a travel scenario corresponding to the query request.
S202: determining a usual travel mode of the target user based on the user portrait.
S203: determining the usual travel mode of the target user and the travel scenario corresponding to the query request as the specified travel condition.

In the embodiments of the present disclosure, the usual travel mode of the target user and the travel scenario corresponding to the query request are determined as the specified travel condition, so that the target site recommended for the user may better meet the habits and travel requirements of the user, thereby further ensuring the pertinence of the target site.

The specified travel condition includes but is not limited to the travel mode of the target user and the travel scenario of the target user. The travel mode includes but is not limited to walking, taking a bus, and driving. The travel scenario includes at least one of: a travel time of the target user, and an area type of an area to which the target position belongs.

The travel time may specifically be a current time corresponding to the query request, and also may be a time pre-selected by the target user.

The area type of the area to which the target position belongs, includes but is not limited to downtown, suburbs, mountainous areas, business districts, and university towns. Correspondingly, a specific implementation of further setting the specified range based on the specified travel condition includes: determining the specified range corresponding to the travel mode in the correspondence between the travel mode and the specified range based on the travel mode. For example, in a case where the travel mode is walking, the specified range is 2 kilometers.

The user portrait is a virtual representative of a real user determined based on user information, user behavior data and the like, and is used to identify the preference and attribute of the real user. In the embodiments of the present disclosure, the preference of a user includes, but is not limited to, the usual travel mode of the user. For example, it is determined based on user information and user behavior data that the travel mode usually chosen by a user in daily travel is taking a bus, then the travel mode usually used by the user is determined as taking a bus.

Figure 3:
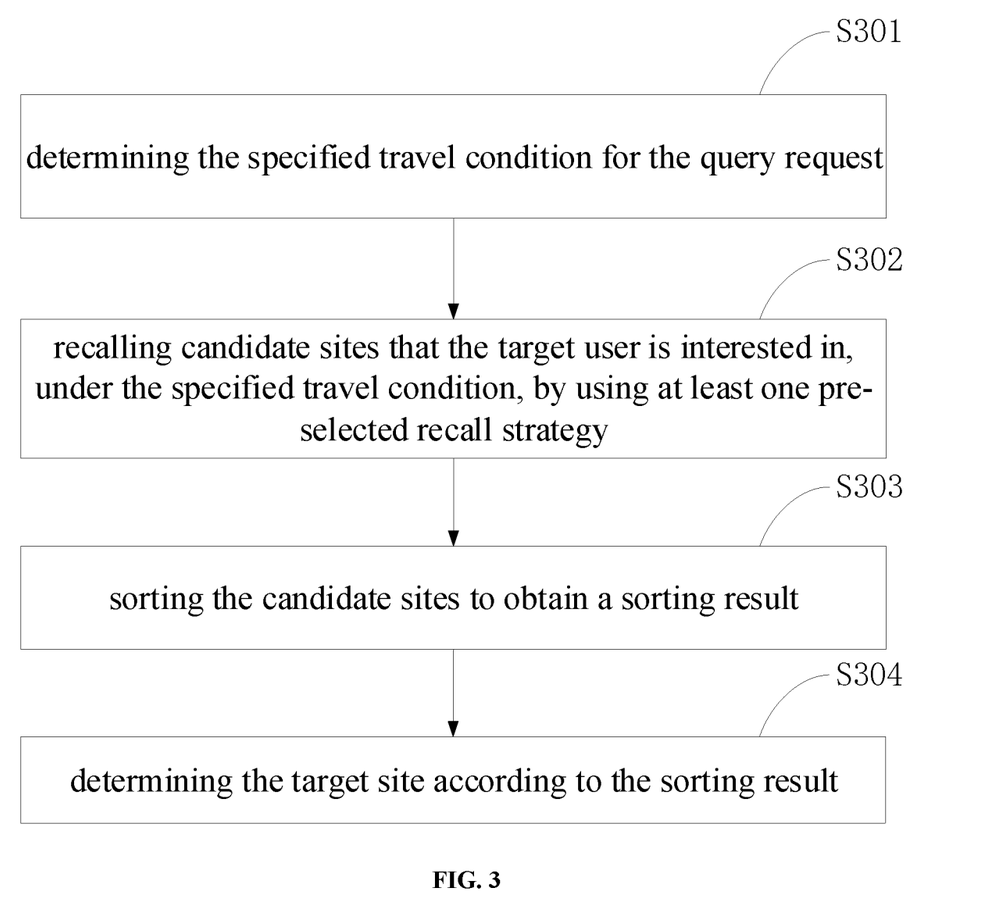
FIG. 3 is a flowchart of a target site determining method according to an embodiment of the present disclosure.

In the embodiments of the present disclosure, please refer to FIG. 3 for the determining the target site. FIG. 3 is a flowchart of a target site determining method according to an embodiment of the present disclosure.

S301: determining the specified travel condition for the query request.
S302: recalling candidate sites that the target user is interested in, under the specified travel condition, by using at least one pre-selected recall strategy.
S303: sorting the candidate sites to obtain a sorting result.
S304: determining the target site according to the sorting result.

In the embodiments of the present disclosure, at least one recall strategy is used to recall candidate sites, which can ensure the diversity of recalled candidate sites, thereby ensuring the diversity of target sites. After the candidate sites are recalled, the candidate sites may be sorted first, and then the target site may be determined according to the sorting result, thereby ensuring that the target site can better meet the requirements of the target user.

The pre-selected at least one recall strategy may refer to one or more recall strategies pre-selected for the query request in a pre-constructed recall strategy list.

The sorting the candidate sites to obtain a sorting result includes: based on a preset sorting rule, sorting the candidate sites according to the sorting order of the candidate sites. Correspondingly, the target site is determined according to the sorting result, and for the sorting result, based on a preset quantity of target sites, candidate sites corresponding to the quantity are determined as target sites.

The sorting the candidate sites to obtain a sorting result further includes: inputting the candidate sites into a trained sorting model, to obtain the target site.

The trained sorting model is a sorting model trained based on a pre-constructed positive sample set and a pre-constructed negative sample set, the positive sample set is a sample set constructed based on a pair of sites in which a secondary transformation behavior occurs in a pre-divided time period, and the negative sample set is a sample set constructed based on a pair of sites in which the secondary transformation behavior does not occur in the pre-divided time period.

The secondary transformation behavior includes but is not limited to initiating a navigation behavior.

The pre-constructed positive sample set and the pre-constructed negative sample set are positive and negative sample sets constructed based on historical behavior data of the user. A specific implementation process includes: firstly, dividing historical behavior data of a plurality of users by day; secondly, dividing each day into a plurality of time periods according to a specified time interval, and obtaining historical behavior data in each pre-divided time period; thirdly, determining, based on the historical behavior data in each time period, site pairs where the secondary transformation behavior occurs, which is constructed as a positive sample; finally, determining, based on the historical behavior data in each time period, site pairs where the secondary transformation behavior does not occur, which is constructed as a negative sample.

In general, the trained sorting model is a GBRank model.

The duration corresponding to the pre-divided time period may be 60 seconds, 2 minutes, 5 minutes, or the like. Generally, the duration corresponding to the pre-divided time period is determined based on a priori value.

In the embodiments of the present disclosure, a positive sample set and a negative sample set are used to train the sorting model. The positive sample set may include a sample set constructed by site pairs where the secondary transformation behavior occurs within the pre-divided time period. The negative sample set may include a sample set constructed by site pairs where the secondary transformation behavior does not occur within the pre-divided time period. The foregoing sample sets may be used to train the sorting model, which can reduce the noise in the training sample sets and ensure the accuracy of the sorting model.

In order to ensure that the target site can conform to the specified travel condition, and reduce the workload of recalling the candidate sites, in the embodiments of the present disclosure, the scope of recalling the candidate sites may be limited first. A specific implementation includes: first, a plurality of sites matching with the specified travel condition are determined within the specified range of the target position; then, each recall strategy is used to recall corresponding candidate sites for the plurality of sites.

For example, in a case where the travel time is at night, a site that is only open during the day does not belong to a site that matches with the specified travel condition, and a site with the same opening time as the travel time may be a site that matches with the specified travel condition.

In addition, in order to ensure that the target site is a site that the target user is interested in, in the embodiments of the present disclosure, before a plurality of sites are determined, initial screening may be performed on sites within a specified range first based on the income, age and the like of the user, and then a plurality of sites that match with the specified travel condition are determined.

In the embodiments of the present disclosure, in a case where the recall strategy includes a first recall strategy for recalling the candidate sites based on a site similarity, a specific implementation of recalling the corresponding candidate sites for the plurality of sites includes: first, determining, based on historical user behavior data of the target user, a historical site that the target user is interested in; then, calculating site similarities between the historical site and the plurality of sites; and finally, recalling, among the plurality of sites, sites with the site similarities exceeding a corresponding threshold as the candidate sites.

Based on the site similarities between the historical site that the target user is interested in and a plurality of sites, sites with the site similarities exceeding the corresponding threshold are recalled as the candidate sites, which can ensure that the determined target site can be more interesting to the user.

The site similarity may be calculated by the following formula:

$$p_{uj} = \sum_{i \in N(u) \cap S(i,j)} W_{ij} r_{ui}, \text{ wherein } W_{ij} = \frac{\sum_{u \in N(i) \cap N(j)} \frac{1}{\log 1 + |N(u)|}}{\sqrt{|N(i)||N(j)|}},$$

$w_{ij}$ is used to represent a site similarity between an i-th historical site and a j-th site; i is used to represent the i-th historical site; j is used to represent the j-th site among a plurality of sites; u is used to represent a target user; N(i) is used to represent a set of users interested in the i-th historical site; N(j) is used to represent a set of users interested in the j-th site; |N(i)| is used to represent a cumulative quantity of visits of the i-th historical site; |N(j)| is used to represent a cumulative quantity of visits of the j-th site; |N(u)| is used to represent a degree of activity of the target user; $p_{uj}$ is used to represent an interesting degree of the target user for the j-th site; and $r_{ui}$ is used to represent an interesting degree of the target user for the j-th historical site.

In a case where the recall strategy includes a second recall strategy for recalling the candidate sites based on a site popularity, a specific implementation of recalling the corresponding candidate sites for the plurality of sites includes: first, determining the site popularity corresponding to each of the plurality of sites; and then recalling, among the plurality of sites, sites with site popularities exceeding a corresponding threshold as the candidate sites.

The site popularity includes, but is not limited to, the quantity of times a site is clicked or searched.

Among the plurality of sites, sites with popularities exceeds the corresponding threshold are recalled as the candidate sites, which can ensure that the recalled candidate sites are liked by the public, and further ensure that the determined target site can be more interesting to the user.

In a case where the recall strategy includes a third recall strategy for recalling the candidate sites based on a site type, a specific implementation of recalling the corresponding candidate sites for the plurality of sites includes: first, determining the site type corresponding to each of the plurality of sites; and then recalling, among the plurality of sites, sites having a site type same as a site type of a site to which the target position belongs as the candidate sites.

The recalling, among the plurality of sites, sites having a site type same as a site type of a site to which the target position belongs as the candidate sites can ensure that the determined target site is more interesting to the user.

The site types include, but are not limited to, residences, restaurants, scenic spots, subway stations, companies, and stations.

In a case where the recall strategy includes a fourth recall strategy for recalling the candidate sites based on a relationship between sites, a specific implementation of recalling the corresponding candidate sites for the plurality of sites includes: first, determining the relationship between each of the plurality of sites and the target position; and then recalling, among the plurality of sites, sites with relationships exceeding a corresponding threshold as the candidate sites.

The recalling, among the plurality of sites, sites with relationships exceeding a corresponding threshold as the candidate sites can ensure that the recalled candidate sites are sites with a high relationship with the target position, thereby ensuring that the determined target site can be more interesting to the user.

In the embodiments of the present disclosure, the relationship may be obtained by the following formula: PV RATIO (the cumulative ratio of visits)=(the cumulative quantity of visits co-occurring between the target position and an association point M)/(the cumulative quantity of visits with co-occurrence of all association points under the target position). Herein, the association point M refers to the site M in which a secondary transformation behavior occur with the target position within a specified range after the user retrieves or clicks on the target position.

In order to enable the target user to better understand the target site, so that the target user can select the target site to go, in the embodiments of the present disclosure, in a case where the target site is determined, core information corresponding to the target site is further obtained, and the core information is sent to the user terminal, to display on a target page by the user terminal.

The core information corresponding to the target site includes, but is not limited to, static information of the target site, and route information from the target position to the corresponding target site under the specified travel condition.

The static information includes, but is not limited to, an opening time corresponding to the target site, position details corresponding to the target site, and a label of the target site. The static information may include: an opening time of the scenic spot, ticket information of the scenic spot, position details of the scenic spot, and the like.

The route information includes, but is not limited to, a travel route planned based on the travel mode and the travel time, and the time required for the travel route.

Figure 4:
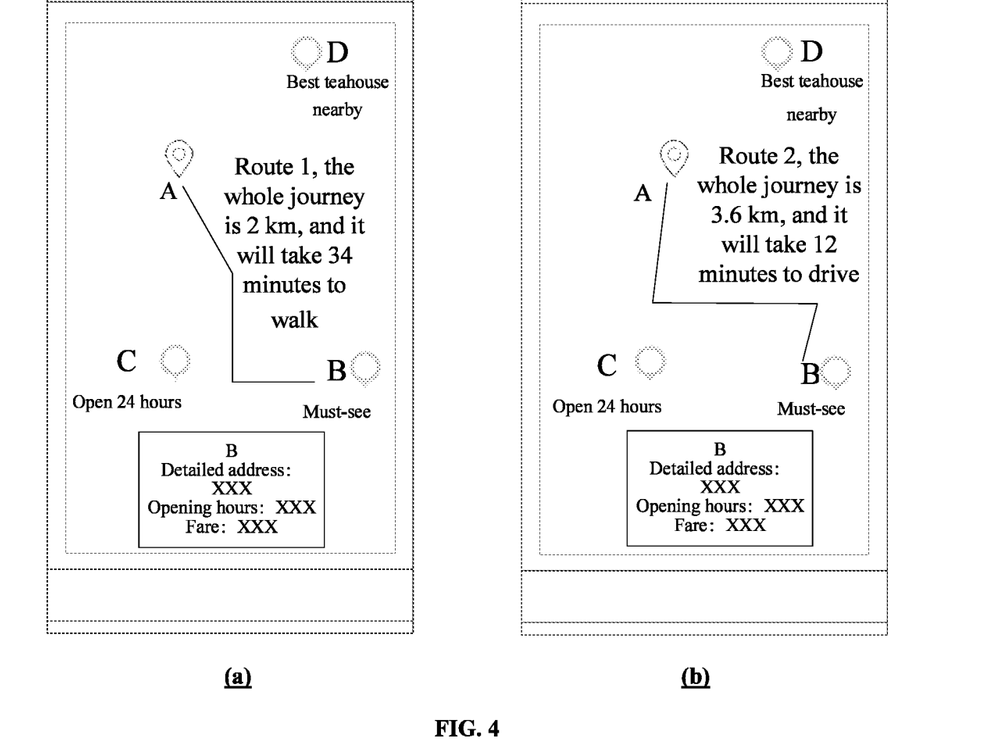

Taking FIG. 4 as an example, FIG. 4 is a schematic diagram of a recommendation result display according to an embodiment of the present disclosure. The user terminal in FIG. 4 is a mobile phone running an electronic map. In a case where users with different travel modes click on a target position A, core information displayed for the same target sites B, C, and D are different from each other. Taking the target site B as an example, the route information from A to B in the walking mode is different from the route information from A to B in the driving mode. Specifically, referring to (a) of FIG. 4, for the walking mode, the planned travel route (A to B) is Route 1, and the time required for the travel route is 34 minutes; and referring to (b) of FIG. 4, for the driving mode, the planned travel route (A to B) is Route 2, and the time required for the travel route is 12 minutes. In other words, different travel conditions are corresponding to different route information.

It should be noted that, in the embodiments of the present disclosure, there are generally a plurality of target site data, but only three target site data are shown in FIG. 4. In other words, FIG. 4 only takes three target sites (B, C, and D) as examples to illustrate the recommendation results.

In addition, it should be noted that the user data, user behavior data, user portraits and the like in the embodiments of the present disclosure may come from public datasets, or the user data, user behavior data, user portraits and the like may be authorized by relevant users.

Figure 5:
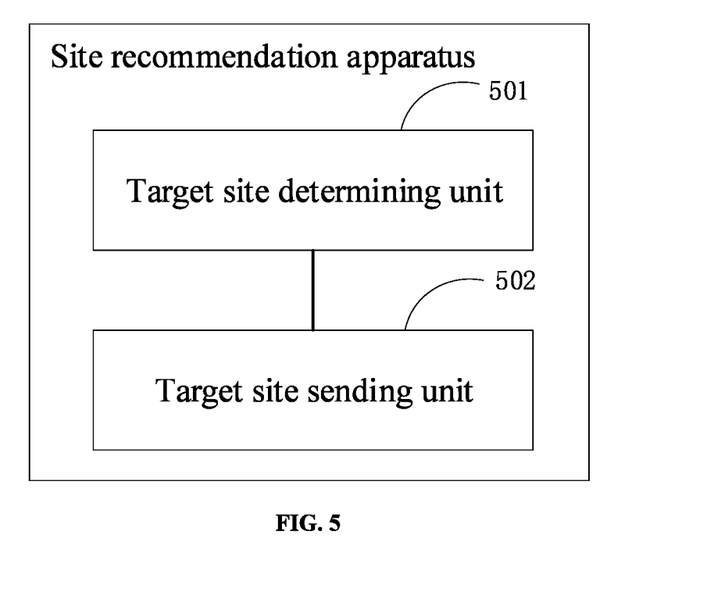
FIG. 5 is a schematic diagram of a site recommendation apparatus according to an embodiment of the present disclosure.

As shown in FIG. 5, the embodiments of the present disclosure provide a site recommendation apparatus, and the apparatus includes:
- a target site determining unit 501 configured for determining, in response to a query request of a user terminal for a target position, a target site recommended to a target user within a specified range of the target position, wherein the target site includes a site that the target user is interested in under a specified travel condition; and
- a target site sending unit 502 configured for sending the target site to the user terminal.

In an implementation, the target site determining unit 501 may include:
- a travel condition determining subunit configured for determining the specified travel condition for the query request;
- a candidate site collection subunit configured for recalling candidate sites that the target user is interested in, under the specified travel condition, by using at least one pre-selected recall strategy;
- a sorting result obtaining subunit configured for sorting the candidate sites to obtain a sorting result; and
- a target point of interest determining subunit configured for determining the target site according to the sorting result.

In an implementation, the candidate site collection subunit may include:
- a site matching unit configured for determining, within the specified range of the target position, a plurality of sites matching with the specified travel condition; and
- a candidate site recall subunit configured for recalling corresponding candidate sites for the plurality of sites by using the recall strategy.

In an implementation, the candidate site recall subunit may include:
- a historical site determining subunit configured for, in a case where the recall strategy includes a first recall strategy for recalling the candidate sites based on a site similarity, determining, based on historical user behavior data of the target user, a historical site that the target user is interested in;
- a site similarity calculation subunit configured for calculating site similarities between the historical site and the plurality of sites; and
- a first candidate site recall subunit configured for recalling, among the plurality of sites, sites with the site similarities exceeding a corresponding threshold as the candidate sites.

In an implementation, the candidate site recall subunit may include:
- a site popularity determining subunit configured for, in a case where the recall strategy includes a second recall strategy for recalling the candidate sites based on a site popularity, determining the site popularity corresponding to each of the plurality of sites; and
- a second candidate site recall subunit configured for recalling, among the plurality of sites, sites with site popularities exceeding a corresponding threshold as the candidate sites.

In an implementation, the candidate site recall subunit may include:
- a site type determining subunit configured for, in a case where the recall strategy includes a third recall strategy for recalling the candidate sites based on a site type, determining the site type corresponding to each of the plurality of sites; and
- a third candidate site recall subunit configured for recalling, among the plurality of sites, sites having a site type same as a site type of a site to which the target position belongs as the candidate sites.

In an implementation, the candidate site recall subunit may include:
- a relationship determining subunit configured for, in a case where the recall strategy includes a fourth recall strategy for recalling the candidate sites based on a relationship between sites, determining the relationship between each of the plurality of sites and the target position; and
- a fourth candidate site recall subunit configured for recalling, among the plurality of sites, sites with relationships exceeding a corresponding threshold as the candidate sites.

In an implementation, the travel condition determining subunit may include:
- a data obtaining subunit configured for, in a case where the specified travel conditions include a travel mode and a travel scenario, obtaining a user portrait of the target user and a travel scenario corresponding to the query request;
- a travel mode determining subunit configured for determining a usual travel mode of the target user based on the user portrait; and
- a specified travel condition determining subunit configured for determining the usual travel mode of the target user and the travel scenario corresponding to the query request as the specified travel condition,
- wherein the travel scenario includes at least one of: a travel time of the target user, and an area type of an area to which the target position belongs.

In an implementation, the sorting result obtaining subunit may include:
- a target site determining subunit configured for inputting the candidate sites into a trained sorting model, to obtain the target site,
- wherein the trained sorting model is a sorting model trained based on a pre-constructed positive sample set and a pre-constructed negative sample set, the positive sample set is a sample set constructed based on a pair of sites in which a secondary transformation behavior occurs in a pre-divided time period, and the negative sample set is a sample set constructed based on a pair of sites in which the secondary transformation behavior does not occur in the pre-divided time period.

In an implementation, the apparatus may further include:
- a core information obtaining unit configured for obtaining core information corresponding to the target site, wherein the core information includes at least static information of the target site, and route information from the target position to a corresponding target site under the specified travel condition; and
- a core information sending unit configured for sending the core information to the user terminal.

In the technical solution of the present disclosure, the acquisition, storage and application of the user's personal information involved are in compliance with the provisions of relevant laws and regulations, and do not violate public order and good customs.

According to the embodiments of the present disclosure, the present disclosure further provides an electronic device and a readable storage medium.

Figure 6:
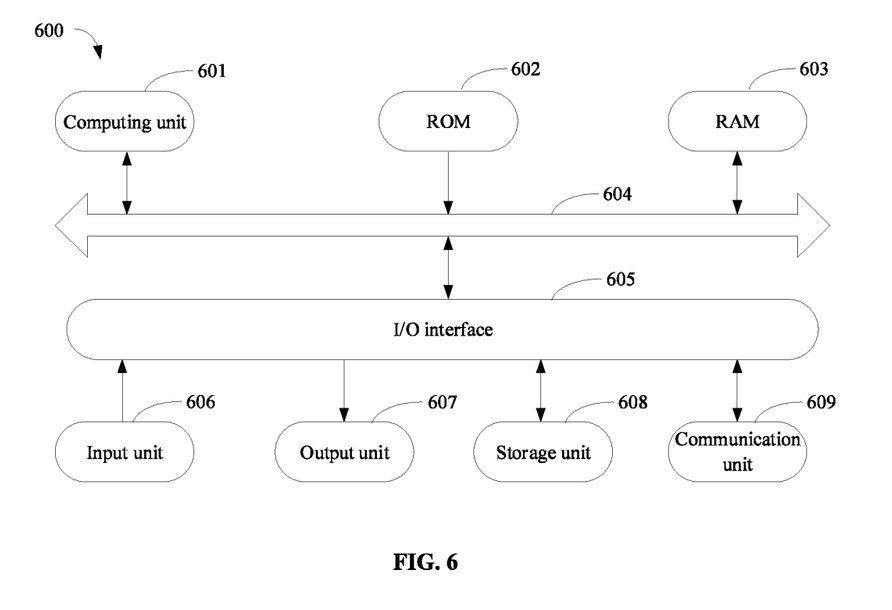
FIG. 6 is a schematic diagram of an electronic device according to an embodiment of the present disclosure.

FIG. 6 shows a schematic diagram of an example electronic device 600 configured for implementing the embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 6, the electronic device 600 includes a computing unit 601 that may perform various suitable actions and processes in accordance with computer programs stored in a read only memory (ROM) 602 or computer programs loaded from a storage unit 608 into a random access memory (RAM) 603. In the RAM 603, various programs and data required for the operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the electronic device 600 to exchange information/data with other devices over a computer network, such as the Internet, and/or various telecommunications networks.

The computing unit 601 may be various general purpose and/or special purpose processing assemblies having processing and computing capabilities. Some examples of the computing unit 601 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 601 performs various methods and processes described above, such as the site recommendation method. For example, in some embodiments, the site recommendation method may be implemented as computer software programs that are physically contained in a machine-readable medium, such as the storage unit 608. In some embodiments, some or all of the computer programs may be loaded into and/or installed on the electronic device 600 via the ROM 602 and/or the communication unit 609. In a case where the computer programs are loaded into the RAM 603 and executed by the computing unit 601, one or more of steps of the site recommendation method may be performed. Alternatively, in other embodiments, the computing unit 601 may be configured to perform the site recommendation method in any other suitable manner (e.g., by means of a firmware).

Various embodiments of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

The program codes for implementing the methods of the present disclosure may be written in any combination of one or more programming languages. These program codes may be provided to a processor or controller of a general purpose computer, a special purpose computer, or other programmable data processing apparatus such that the program codes, when executed by the processor or controller, enable the functions/operations specified in the flowchart and/or the block diagram to be performed. The program codes may be executed entirely on a machine, partly on a machine, partly on a machine as a stand-alone software package and partly on a remote machine, or entirely on a remote machine or server.

In the context of the present disclosure, the machine-readable medium may be a tangible medium that may contain or store programs for using by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, and may also be a server of a distributed system, or a server incorporating a blockchain.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A computer-implemented site recommendation method, comprising:
   determining, in response to a query request of a user terminal for a target position, a specified travel condition and a target site recommended to a target user within a specified range of the target position, wherein the target position comprises a current position of the target user positioned by the user terminal based on a positioning system, the target site comprises a site that the target user is interested in under the specified travel condition, and the target site is a site determined from one or more sites that the target user is interested in and is matched with the specified travel condition; and
   sending the target site to the user terminal,
   wherein determining the specified travel condition comprises:
   obtaining a user portrait of the target user and a travel scenario corresponding to the query request; wherein the travel scenario comprises at least one of: a travel time of the target user, and an area type of an area to which the target position belongs;
   determining a usual travel mode of the target user based on the user portrait; and
   determining the usual travel mode of the target user and the travel scenario corresponding to the query request as the specified travel condition,
   wherein determining the specified range comprises: determining, based on the usual travel mode, a specified range corresponding to the usual travel mode,
   wherein determining the target site recommended to the target user within the specified range of the target position, comprises:
   recalling candidate sites that the target user is interested in, under the specified travel condition, by using at least one pre-selected recall strategy;
   sorting the candidate sites to obtain a sorting result; and
   determining the target site according to the sorting result,
   wherein the sorting the candidate sites to obtain the sorting result, comprises:
   inputting the candidate sites into a trained sorting model, to obtain the target site;
   wherein the trained sorting model is a sorting model trained based on a pre-constructed positive sample set and a pre-constructed negative sample set, the positive sample set is a sample set constructed based on a pair of sites in which a secondary transformation behavior occurs in a pre-divided time period, and the negative sample set is a sample set constructed based on a pair of sites in which the secondary transformation behavior does not occur in the pre-divided time period,
   wherein the secondary transformation behavior comprises a behavior of initiating a navigation.

2. The method of claim 1, wherein the recalling the candidate sites that the target user is interested in, under the specified travel condition, by using the at least one pre-selected recall strategy, comprises:

determining, within the specified range of the target position, a plurality of sites matching with the specified travel condition; and recalling corresponding candidate sites for the plurality of sites by using the recall strategy.

3. The method of claim 2, wherein in a case where the recall strategy comprises a first recall strategy for recalling the candidate sites based on a site similarity, the recalling the corresponding candidate sites for the plurality of sites, comprises:

determining, based on historical user behavior data of the target user, a historical site that the target user is interested in;

calculating site similarities between the historical site and the plurality of sites; and recalling, among the plurality of sites, sites with the site similarities exceeding a corresponding threshold as the candidate sites.

4. The method of claim 2, wherein in a case where the recall strategy comprises a second recall strategy for recalling the candidate sites based on a site popularity, the recalling the corresponding candidate sites for the plurality of sites, comprises:

determining the site popularity corresponding to each of the plurality of sites; and recalling, among the plurality of sites, sites with site popularities exceeding a corresponding threshold as the candidate sites.

5. The method of claim 2, wherein in a case where the recall strategy comprises a third recall strategy for recalling the candidate sites based on a site type, the recalling the corresponding candidate sites for the plurality of sites, comprises:

determining the site type corresponding to each of the plurality of sites; and recalling, among the plurality of sites, sites having a site type same as a site type of a site to which the target position belongs as the candidate sites.

6. The method of claim 2, wherein in a case where the recall strategy comprises a fourth recall strategy for recalling the candidate sites based on a relationship between sites, the recalling the corresponding candidate sites for the plurality of sites, comprises:

determining the relationship between each of the plurality of sites and the target position; and recalling, among the plurality of sites, sites with relationships exceeding a corresponding threshold as the candidate sites.

7. The method of claim 1, further comprising:

obtaining core information corresponding to the target site, wherein the core information comprises at least static information of the target site, and route information from the target position to a corresponding target site under the specified travel condition; and sending the core information to the user terminal.

8. An electronic device, comprising:

at least one processor; and a memory communicatively connected with the at least one processor, wherein the memory stores instructions executable by the at least one processor, and the instructions, when executed by the at least one processor, enable the at least one processor to perform operations of:

determining, in response to a query request of a user terminal for a target position, a specified travel condition and a target site recommended to a target user within a specified range of the target position, wherein the target position comprises a current position of the target user positioned by the user terminal based on a positioning system, the target site comprises a site that the target user is interested in under the specified travel condition, and the target site is a site determined from one or more sites that the target user is interested in and is matched with the specified travel condition; and sending the target site to the user terminal, wherein determining the specified travel condition comprises:

obtaining a user portrait of the target user and a travel scenario corresponding to the query request; wherein the travel scenario comprises at least one of: a travel time of the target user, and an area type of an area to which the target position belongs;

determining a usual travel mode of the target user based on the user portrait; and determining the usual travel mode of the target user and the travel scenario corresponding to the query request as the specified travel condition, wherein determining the specified range comprises: determining, based on the usual travel mode, a specified range corresponding to the usual travel mode, wherein the instructions, when executed by the at least one processor, enable the at least one processor to further perform operations of:

recalling candidate sites that the target user is interested in, under the specified travel condition, by using at least one pre-selected recall strategy;

sorting the candidate sites to obtain a sorting result; and determining the target site according to the sorting result, wherein the instructions, when executed by the at least one processor, enable the at least one processor to further perform operations of:

inputting the candidate sites into a trained sorting model, to obtain the target site;

wherein the trained sorting model is a sorting model trained based on a pre-constructed positive sample set and a pre-constructed negative sample set, the positive sample set is a sample set constructed based on a pair of sites in which a secondary transformation behavior occurs in a pre-divided time period, and the negative sample set is a sample set constructed based on a pair of sites in which the secondary transformation behavior does not occur in the pre-divided time period;

wherein the secondary transformation behavior comprises a behavior of initiating a navigation.

9. The electronic device of claim 8, wherein the instructions, when executed by the at least one processor, enable the at least one processor to further perform operations of:

determining, within the specified range of the target position, a plurality of sites matching with the specified travel condition; and recalling corresponding candidate sites for the plurality of sites by using the recall strategy.

10. The electronic device of claim 9, wherein in a case where the recall strategy comprises a first recall strategy for recalling the candidate sites based on a site similarity, the instructions, when executed by the at least one processor, enable the at least one processor to further perform operations of:

determining, based on historical user behavior data of the target user, a historical site that the target user is interested in;

calculating site similarities between the historical site and the plurality of sites; and recalling, among the plurality of sites, sites with the site similarities exceeding a corresponding threshold as the candidate sites.

11. The electronic device of claim 9, wherein in a case where the recall strategy comprises a second recall strategy for recalling the candidate sites based on a site popularity, the instructions, when executed by the at least one processor, enable the at least one processor to further perform operations of:
determining the site popularity corresponding to each of the plurality of sites; and
recalling, among the plurality of sites, sites with site popularities exceeding a corresponding threshold as the candidate sites.

12. The electronic device of claim 9, wherein in a case where the recall strategy comprises a third recall strategy for recalling the candidate sites based on a site type, the instructions, when executed by the at least one processor, enable the at least one processor to further perform operations of:
determining the site type corresponding to each of the plurality of sites; and
recalling, among the plurality of sites, sites having a site type same as a site type of a site to which the target position belongs as the candidate sites.

13. The electronic device of claim 9, wherein in a case where the recall strategy comprises a fourth recall strategy for recalling the candidate sites based on a relationship between sites, the instructions, when executed by the at least one processor, enable the at least one processor to further perform operations of:
determining the relationship between each of the plurality of sites and the target position; and
recalling, among the plurality of sites, sites with relationships exceeding a corresponding threshold as the candidate sites.

14. The electronic device of claim 8, wherein the instructions, when executed by the at least one processor, enable the at least one processor to further perform operations of:
obtaining core information corresponding to the target site, wherein the core information comprises at least static information of the target site, and route information from the target position to a corresponding target site under the specified travel condition; and
sending the core information to the user terminal.

15. A non-transitory computer-readable storage medium storing computer instructions, wherein the computer instructions, when executed by a computer, cause the computer to perform operations of:
determining, in response to a query request of a user terminal for a target position, a specified travel condition and a target site recommended to a target user within a specified range of the target position, wherein the target position comprises a current position of the target user positioned by the user terminal based on a positioning system, the target site comprises a site that the target user is interested in under the specified travel condition, and the target site is a site determined from one or more sites that the target user is interested in and is matched with the specified travel condition; and
sending the target site to the user terminal,
wherein determining the specified travel condition comprises:
obtaining a user portrait of the target user and a travel scenario corresponding to the query request; wherein the travel scenario comprises at least one of: a travel time of the target user, and an area type of an area to which the target position belongs;
determining a usual travel mode of the target user based on the user portrait; and
determining the usual travel mode of the target user and the travel scenario corresponding to the query request as the specified travel condition,
wherein determining the specified range comprises: determining, based on the usual travel mode, a specified range corresponding to the usual travel mode,
wherein the computer instructions, when executed by the computer, further cause the computer to perform operations of:
recalling candidate sites that the target user is interested in, under the specified travel condition, by using at least one pre-selected recall strategy;
sorting the candidate sites to obtain a sorting result; and
determining the target site according to the sorting result,
wherein the computer instructions, when executed by the computer, further cause the computer to perform operations of:
inputting the candidate sites into a trained sorting model, to obtain the target site;
wherein the trained sorting model is a sorting model trained based on a pre-constructed positive sample set and a pre-constructed negative sample set, the positive sample set is a sample set constructed based on a pair of sites in which a secondary transformation behavior occurs in a pre-divided time period, and the negative sample set is a sample set constructed based on a pair of sites in which the secondary transformation behavior does not occur in the pre-divided time period;
wherein the secondary transformation behavior comprises a behavior of initiating a navigation.

\* \* \* \* \*